Jan. 1, 1929.  A. A. EWALD  1,697,232

HOSE CLAMP

Filed Jan. 10, 1927

INVENTOR
Arno A. Ewald
BY
Erwin, Wheeler & Woolard
ATTORNEYS

Patented Jan. 1, 1929.

1,697,232

UNITED STATES PATENT OFFICE.

ARNO A. EWALD, OF OAKFIELD, WISCONSIN, ASSIGNOR TO ROMORT MANUFACTURING COMPANY, OF OAKFIELD, WISCONSIN, A CORPORATION OF WISCONSIN.

HOSE CLAMP.

Application filed January 10, 1927. Serial No. 160,028.

This invention relates to improvements in hose clamps.

It is the primary object of the invention to provide a novel, simple and economical form of hose clamp which will be easily operable and will act upon the hose with such uniformity of clamping action as will adapt it for use on air hose lines.

The clamp to which this invention relates is of a type in which a metallic annulus having numerous axially extending clamping fingers is fitted over the end of the hose and the fingers are hammered down upon the hose with a clamping effect upon a pipe or nipple received therein. Devices of this type heretofore known have not been suitable for use on air hose due to the fact that there has been sufficient irregularity of clamping action on the separate hammering down of the several fingers so that the hose has become slightly crimped or corrugated in the course of application of the clamp. As a result, there has been considerable leakage of air under high pressure in the use of old forms of clamps of this type.

The present invention contemplates a clamp which will require no skill for its application to any air hose, which will have a neat and attractive appearance when in use and will properly finish the union of the air hose and the appliance to which it is to be connected; and which will include an intermediate pressure distributor between the hose and the several pressure fingers of the clamp so that the clamping action will be smooth and will not crimp or flute the hose.

In the drawings.

Like parts are identified by the same reference characters throughout the several views.

Figure 1:
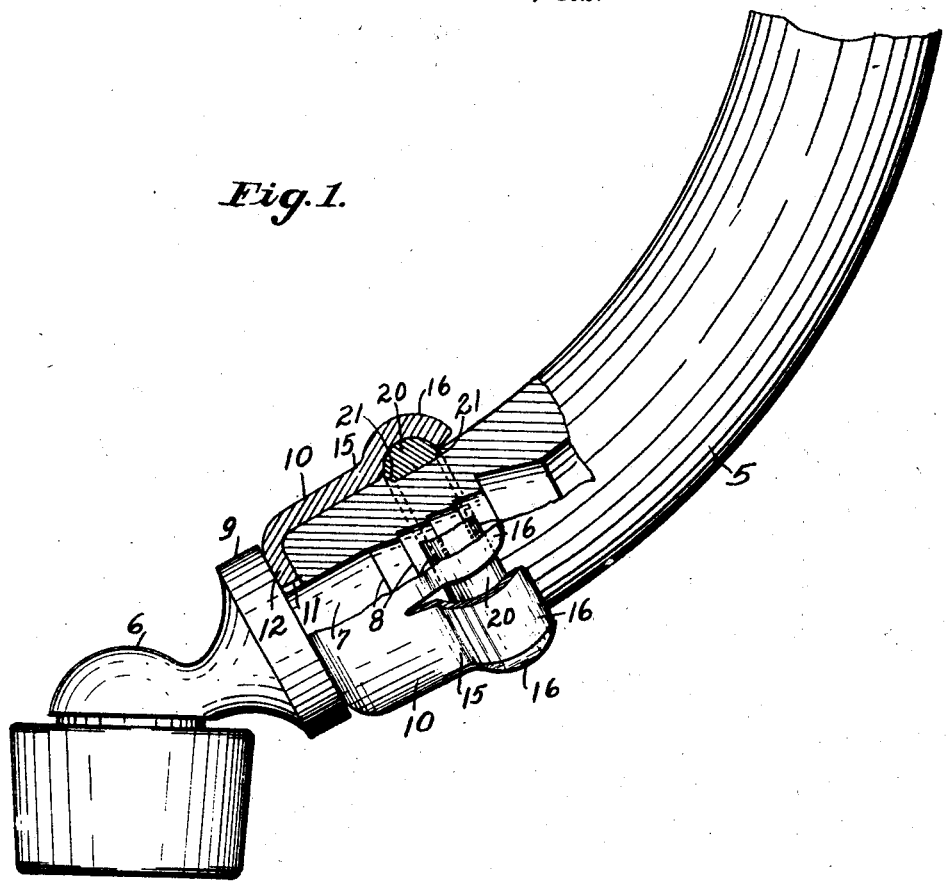
Figure 1 is a side elevation of an air hose having a tire filling valve applied thereto with an improved clamping device embodying this invention, a portion of the hose and clamp being broken away to an axial section to expose the interior construction.
Figure 3:
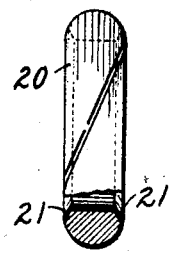
Figure 3 is a detail view in side elevation of the pressure transmitting element used in conjunction with the clamp, a portion thereof being broken away to show its conformation in cross section.
Figure 2:
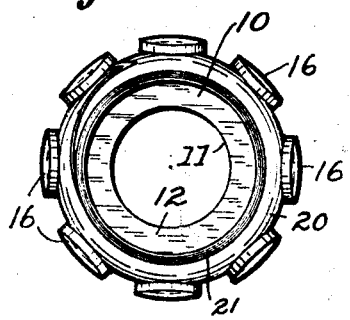
Figure 2 is an end elevation looking at the open end of the clamp.

The air hose is shown at 5 and the tire filling valve 6 will be understood to be typical of any appliance to which it is desired to establish a coupling of the air hose. The appliance 6 has a shank 7 which is preferably shouldered in the usual manner at 8 to provide peripheral teeth into which the interior of the air hose 5 is adapted to be pressed to make an air-tight connection. A flange 9 defines the inner end of shank 7. The clamp itself comprises a cup-shaped member 10 having an opening at 11 of sufficient size to receive the shank 7 of the appliance 6. The annular flange 12 which comprises the bottom of cup-shaped member 10 is adapted to be received between the end of hose 5 and the flange 9 of appliance 6, as is clearly shown in Figure 1 of the drawing. This not only produces a neat and finished appearance in the completed article, but it further operates to fix the position of the clamp when the clamp is in use.

Projecting in an axial direction from cup 10 are the several arms 15, each of which is provided at its extremity with a portion curved away from the axis of the device to constitute a curved finger having a concave inner surface.

The several concave finger portions 16 of arms 15 together provide an interior annular channel in the mouth of the clamping cup, within which is confined a split ring 20. The exact form of this ring is immaterial. Its function is merely to transmit clamping pressure from the individual arms and fingers to the air hose 5 and to distribute such pressure in such a way that it will not be localized beneath any given finger in such a way as to crimp the air hose. It is preferred that the outer surface of the split ring should be curvilinear in cross section to fit in a general way into the channel formed by the concave inner surface of fingers 16. It is likewise preferred that the inner margins of the ring should be bevelled at 21, the better to grip the rubber hose 5.

It will be understood that the material of which the clamping cup 10, arms 15 and fingers 16 are integrally formed will be chosen to have such characteristics that repeated bending will not cause it to break, but that the arms and fingers will hold any form to which they are forced by hammering or compression, or the like. With the device in position for use, the arms 15 will be slightly divergent and the pressure distributor member 20 will thereby be expanded to a size sufficient so that it will readily remain within the curved fingers 16 and will readily receive the end of the air hose 5. The clamping device will then be assembled on the end of the air hose and the hose and clamping device will receive the shank portion 7 of any desired appliance coupling.

With the air hose and appliance in their proper relative relations, the clamp being loosely fitted about the air hose with its flange engaged between the end of the air hose and the appliance to be coupled thereto, the individual finger portions 16 of arms 15 of the clamp will be forced down either by a hammer blow or some other means of exerting pressure. It will be obvious that in view of the split ring or pressure transmitting member 20, the clamping action of each individual finger will be distributed around the periphery of the hose. Thus, even though the fingers are struck down individually by hammer blows, the result on the hose will be practically the same as though all were compressed simultaneously. The encircling band prevents any part of the hose from being forced into longitudinal convolutions such as would permit the escape of air.

This characteristic of the device of my invention makes it possible for persons who do not have machines for exerting pressure uniformly around the periphery of a hose clamp to operate my clamp with the same effectiveness as if such a machine were used. At the same time, the finished device has a neat and attractive appearance and has no radially projecting parts to catch the clothing or fingers of an operator.

While it is readily possible to disassemble the split ring from within the grasp of the curvilinear fingers of the clamping cup, it will be obvious that there is a considerable advantage in supplying the assembly unitarily to the trade. The manipulation of the clamp is facilitated by having the split ring already in place within the clamping fingers to receive the end of the hose.

I claim:

1. A hose clamp unit comprising an annular member and a pressure ring, said annular member having flexible clamping fingers with concave interior surfaces adjacent their extremities, said ring being retained by the fingers in the concave surfaces when out of clamping connection with the hose.

2. A hose clamp unit comprising a cup shaped member and a pressure ring, the cup shaped member having a substantially radial flange adapted to be abutted by the end of a hose, flexible arms projecting axially from said flange and open to receive freely the ends of a hose, and internally concave fingers at the ends of said arms, said pressure ring being retained by said fingers in the concave portions thereof when out of clamping connection with the hose.

ARNO A. EWALD.